(12) United States Patent
Gupta

(10) Patent No.: US 10,345,812 B2
(45) Date of Patent: Jul. 9, 2019

(54) METHODS AND APPARATUS FOR OPTIMIZING A TRAJECTORY FOR AN AUTONOMOUS VEHICLE

(71) Applicant: GM GLOBAL TECHNOLOGY OPERATIONS LLC, Detroit, MI (US)

(72) Inventor: Pinaki Gupta, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 69 days.

(21) Appl. No.: 15/402,436

(22) Filed: Jan. 10, 2017

(65) Prior Publication Data

US 2018/0196436 A1    Jul. 12, 2018

(51) Int. Cl.
*G05D 1/02* (2006.01)
*G01S 19/38* (2010.01)

(52) U.S. Cl.
CPC ........... *G05D 1/0212* (2013.01); *G01S 19/38* (2013.01); *G05D 2201/0213* (2013.01)

(58) Field of Classification Search
CPC .......... G05D 1/0212; G05D 2201/0213; G01S 19/38
See application file for complete search history.

(56) References Cited

U.S. PATENT DOCUMENTS 8,473,144 B1 * 6/2013 Dolgov .............. B60W 30/095
701/28

* cited by examiner

*Primary Examiner* — Nadeem Odeh
*Assistant Examiner* — Michael V Kerrigan
(74) *Attorney, Agent, or Firm* — Lorenz & Kopf LLP

(57) ABSTRACT

A method for performing autonomous operation of a vehicle is provided. The method obtains object data, by a plurality of vehicle onboard sensors; obtains road data, by one or more cameras onboard the vehicle; determines, by at least one processor, an initial vehicle trajectory, based on the object data and the road data; identifies, by the at least one processor, a set of constraints associated with the initial vehicle trajectory; determines a final vehicle trajectory, based on the potential vehicle trajectory and the set of constraints; and transmits the final vehicle trajectory to a steering mechanism onboard the vehicle.

15 Claims, 6 Drawing Sheets

METHODS AND APPARATUS FOR OPTIMIZING A TRAJECTORY FOR AN AUTONOMOUS VEHICLE

TECHNICAL FIELD

Embodiments of the subject matter described herein relate generally to determining a vehicle trajectory. More particularly, embodiments of the subject matter relate to calculating and optimizing a vehicle trajectory for use onboard an autonomous vehicle.

BACKGROUND

An autonomous vehicle is a vehicle that is capable of sensing its environment and navigating with little or no user input. During operation, an autonomous vehicle follows a vehicle trajectory that is calculated based on the intended destination and the surroundings of the vehicle throughout the route. Due to the changing nature of the surroundings from the beginning point to the endpoint of the route, the autonomous vehicle may be required to maneuver differently each time the trajectory is calculated. A robust system with the capability to adjust for such dynamic variability may be required, to accommodate such circumstances.

Accordingly, it is desirable to provide an autonomous vehicle with vehicle trajectory information that considers vehicle surroundings. In addition, it is desirable to provide methods, systems, and vehicles incorporating such techniques. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for performing autonomous operation of a vehicle. The method obtains object data, by a plurality of vehicle onboard sensors; obtains road data, by one or more cameras onboard the vehicle; determines, by at least one processor, an initial vehicle trajectory, based on the object data and the road data; identifies, by the at least one processor, a set of constraints associated with the initial vehicle trajectory; determines a final vehicle trajectory, based on the potential vehicle trajectory and the set of constraints; and transmits the final vehicle trajectory to a steering mechanism onboard the vehicle.

Some embodiments of the present disclosure provide a system for performing autonomous operation of a vehicle. The system includes: a system memory element; a plurality of vehicle onboard sensors, configured to obtain object data associated with objects surrounding the vehicle; one or more cameras, configured to obtain road data associated with a road the vehicle is traveling; a steering mechanism for the vehicle, the steering mechanism configured to autonomously maneuver the vehicle according to a set of optimized vehicle trajectory data; and at least one processor communicatively coupled to the system memory element, the plurality of vehicle sensors, the one or more cameras, and the steering mechanism, the at least one processor configured to: determine an initial vehicle trajectory, based on the object data and the road data; identify a set of constraints associated with the initial vehicle trajectory; and calculate a final vehicle trajectory, based on the initial vehicle trajectory and the set of constraints; and transmit the final vehicle trajec-tory to the steering mechanism, wherein the optimized vehicle trajectory data comprises the final vehicle trajectory.

Some embodiments of the present disclosure provide a non-transitory, computer-readable medium containing instructions thereon, which, when executed by a processor, perform a method. The method determines a vehicle trajectory for an autonomous vehicle based on an initial vehicle trajectory and a set of constraints surrounding the autonomous vehicle; and transmits the vehicle trajectory to a steering mechanism onboard the autonomous vehicle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for optimizing an initial vehicle trajectory for use by an autonomous vehicle. More specifically, the subject matter relates to adjusting the initial vehicle trajectory based on "soft" constraints (e.g., lane boundaries) and/or "hard" constraints (e.g., objects, road boundaries).

Certain terminologies are used with regard to the various embodiments of the present disclosure. An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from systems such as global positioning systems (GPS) to navigate. A steering mechanism is any device, hardware, or other instrument used to autonomously maneuver a vehicle according to a predetermined trajectory. The steering mechanism may be implemented using a rear steer mechanism, a front steer mechanism, a differential brake mechanism, or any other component or system operable to autonomously maneuver the vehicle.

Figure 1:
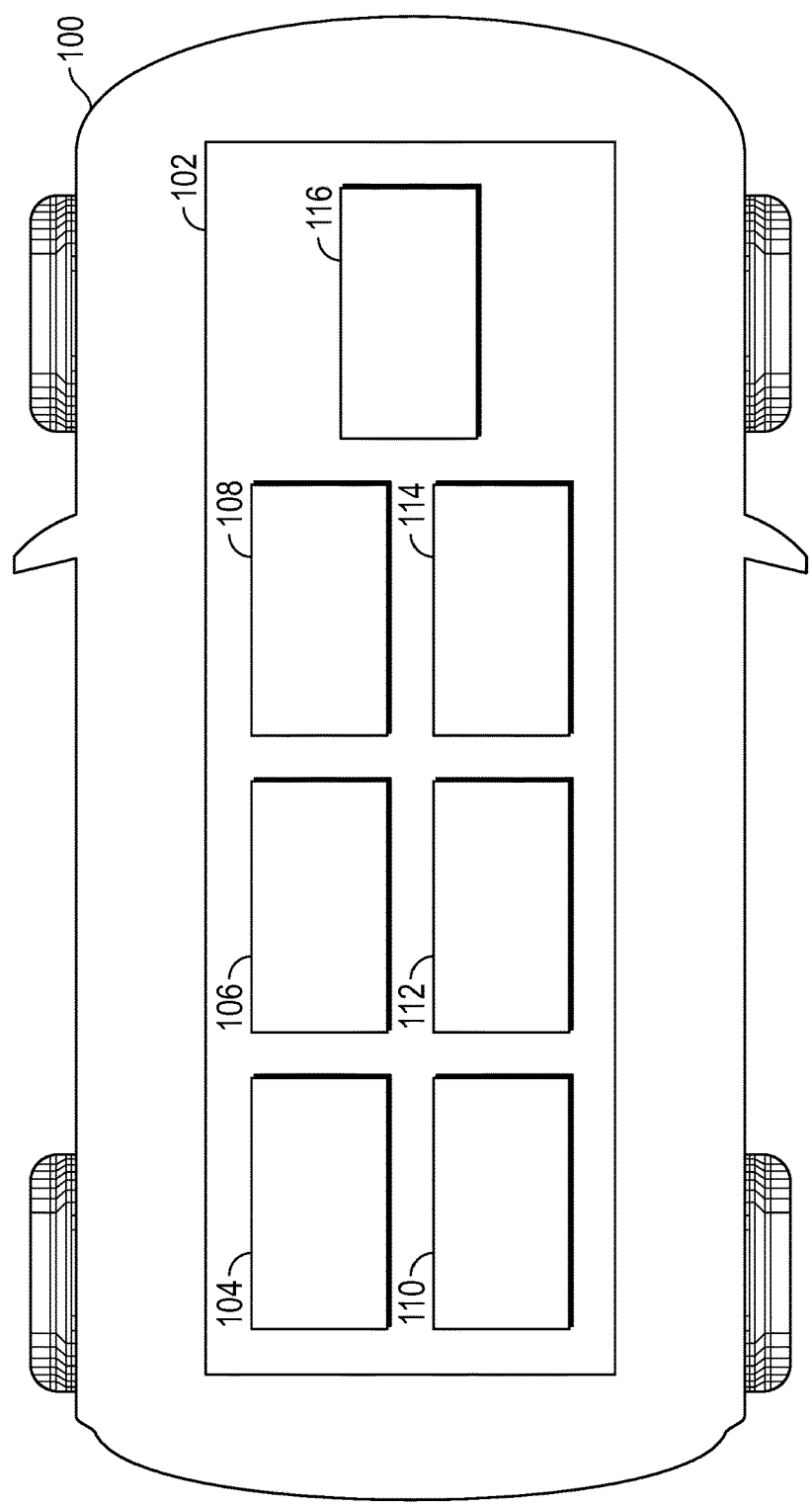
FIG. 1 is a functional block diagram of an autonomous vehicle trajectory optimization system, in accordance with the disclosed embodiments.

Turning now to the figures, FIG. 1 is a functional block diagram of an autonomous vehicle 100, including a vehicle trajectory optimization system 102, in accordance with the disclosed embodiments. The autonomous vehicle 100 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The vehicle trajectory optimization system 102 may be implemented using any vehicle onboard computing system or platform. The vehicle trajectory optimization system 102 generally includes, without limitation: at least one processor 104; a system memory element 106; a navigation system 108; one or more cameras 110; a plurality of vehicle onboard sensors 112; a vehicle trajectory optimization module 114; and a steering mechanism 116. These elements and features of vehicle trajectory optimization system 102 may be operatively associated with one another, coupled to one another, or otherwise configured to cooperate with one another as needed to support the desired functionality—in particular, autonomous operation of the vehicle 100, as described herein. For ease of illustration and clarity, the various physical, electrical, and logical couplings and interconnections for these elements and features are not depicted in FIG. 1. Moreover, it should be appreciated that embodiments of the vehicle trajectory optimization system 102 will include other elements, modules, and features that cooperate to support the desired functionality. For simplicity, FIG. 1 only depicts certain elements that relate to the autonomous vehicle 100 operation techniques described in more detail below.

The at least one processor 104 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 104 may be realized as one or more microprocessors, controllers, microcontrollers, or state machines. Moreover, the at least one processor 104 may be implemented as a combination of computing devices, e.g., a combination of digital signal processors and microprocessors, a plurality of microprocessors, one or more microprocessors in conjunction with a digital signal processor core, or any other such configuration.

The at least one processor 104 communicates with a system memory element 106. The system memory element 106 may be realized using any number of devices, components, or modules, as appropriate to the embodiment. Moreover, the vehicle trajectory optimization system 102 could include a system memory element 106 integrated therein and/or a system memory element 106 operatively coupled thereto, as appropriate to the particular embodiment. In practice, the system memory element 106 could be realized as RAM memory, flash memory, EPROM memory, EEPROM memory, registers, a hard disk, a removable disk, or any other form of storage medium known in the art. In certain embodiments, the system memory element 106 includes a hard disk, which may also be used to support functions of the vehicle trajectory optimization system 102. The system memory element 106 can be coupled to the at least one processor 104 such that the at least one processor 104 can read information from, and write information to, the system memory element 106. In the alternative, the system memory element 106 may be integral to the at least one processor 104. As an example, the at least one processor 104 and the system memory element 106 may reside in a suitably designed application-specific integrated circuit (ASIC).

The navigation system 108 is deployed onboard the host vehicle 100. In practice, the navigation system 108 may be implemented as part of an onboard vehicle entertainment system, an onboard display system, an onboard vehicle instrumentation cluster, or the like. In one practical embodiment, the navigation system 108 is realized as, includes, or cooperates with an onboard global positioning system (GPS) that derives the predicted geographic position of the vehicle in real-time or substantially real-time. The navigation system 108 is configured to provide location data to the vehicle trajectory optimization system 102 of the vehicle 100. When the vehicle 100 is being driven, the navigation system 108 functions to periodically detect and/or measure a predicted location for the vehicle 100. The navigation system 108 may provide this location data to the vehicle trajectory optimization system 102 of the vehicle 100 via a data transmission. A predicted location for the vehicle 100 may be a triangulated position, a latitude/longitude position, x and y coordinates, or any other notation indicative of the geographic position of the vehicle 100.

In certain embodiments, the navigation system 108 is implemented as a GPS that includes a map module which stores the road curvature and rate of curvature change data. In certain embodiments, the map module may include a high definition map of the entire highway. In this scenario, the navigation system 108 provides curvature data of the road ahead of the autonomous vehicle 100 when a GPS location is supplied to the map module. The map module also provides various static lane attributes. The vehicle trajectory optimization system 102 is configured to use GPS to localize the vehicle 100 on the map (provided by the map module) and to extract predicted information ahead. The map module is configured to receive GPS information and to provide the lane curvature and rate of curvature, number of lanes, or the like.

The one or more cameras 110 are suitably configured to capture images outside of the vehicle 100, and this image data is used by the vehicle trajectory optimization system 102 to determine an initial path of the vehicle and a desired trajectory for the vehicle 100, and to maintain positioning of the vehicle 100 inside lane markings on the road upon which the vehicle is traveling. Each of the one or more cameras 110 may have the ability to capture still frames and/or video images. The one or more cameras 110 identify and report the left and right lane marking as two polynomials. The one or more cameras 110 also identify and report objects (e.g., other cars) within view of the one or more cameras 110. Once images are obtained by a camera, the images may be stored or transmitted.

The plurality of vehicle onboard sensors 112 may include velocity sensors, yaw rate sensors, radar sensors, inertial measurement sensors, front wheel angle sensors, rear wheel angle sensors, and any other sensor onboard the vehicle 100 which may be used to provide data associated with autonomous control of the vehicle 100. In some embodiments, Long Range Radar sensors (LRRs) and Short Range Radar sensors (SRRs) are used mainly to detect objects within sensor detection proximity to the autonomous vehicle 100.

The vehicle trajectory optimization module 114 is suitably configured to receive vehicle trajectory data and to determine an "optimized" vehicle trajectory that accounts for various constraints associated with a route that the vehicle 100 is traveling. In exemplary embodiments of the vehicle trajectory optimization system 102, the vehicle trajectory optimization module 114 optimizes a pre-calculated and pre-defined initial trajectory, using a set of constraints, to generate an optimized vehicle trajectory for the autonomous vehicle 100.

In practice, the vehicle trajectory optimization module 114 may be implemented with (or cooperate with) the at least one processor 104 to perform at least some of the functions and operations described in more detail herein. In this regard, the vehicle trajectory optimization module 114 may be realized as suitably written processing logic, application program code, or the like.

The steering mechanism 116 is configured to autonomously maneuver the vehicle according to the optimized vehicle trajectory that is generated by the vehicle trajectory optimization module 114. The steering mechanism 116 may be implemented using a front steer mechanism, a rear steer mechanism, a differential brake mechanism, or any other instrumentation onboard the vehicle 100 operable to steer or maneuver the vehicle 100 as part of an autonomous function of the vehicle 100.

Figure 2:
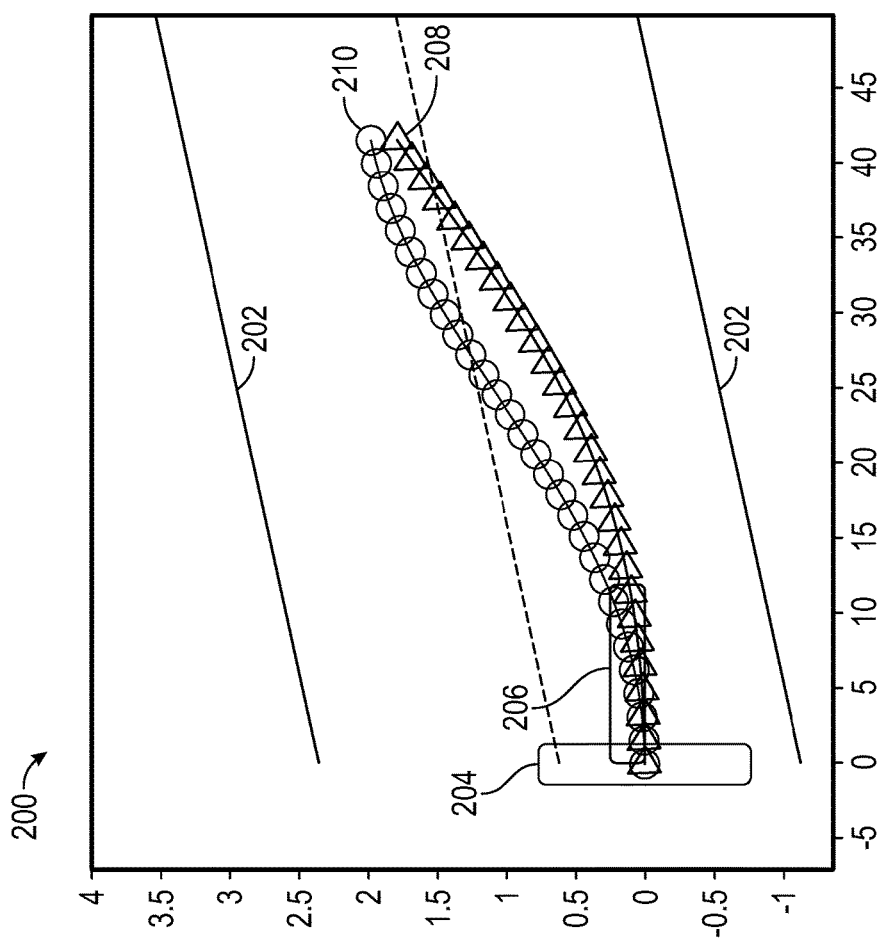
FIG. 2 is a diagram of a potential autonomous vehicle trajectory and an optimized autonomous vehicle trajectory, in accordance with the disclosed embodiments.

FIG. 2 is a diagram of a potential autonomous vehicle trajectory 208 and an optimized autonomous vehicle trajectory 210, in accordance with the disclosed embodiments. Boundary 202 may be a lane boundary (i.e., a soft constraint) or a road boundary (i.e., a hard constraint). A vehicle is represented by vertical rectangle 204, and horizontal rectangle 206 represents the part of the desired trajectory used to calculate the steering command. Here, the entire trajectory is not used to calculated the steering command for the autonomous vehicle 204, as that might be too distant. The system considers the trajectory for a short period of time (e.g., the next two seconds, the next five seconds) to calculate the desired steering angle.

The potential autonomous vehicle trajectory 208 is the pre-calculated, pre-defined initial path for the autonomous vehicle 204. The optimized autonomous vehicle trajectory 210 is an improved version of the potential autonomous vehicle trajectory 208 that considers detected soft constraints and hard constraints in order to generate a more accurate and optimal route for the autonomous vehicle to travel.

The virtual centerline of the lane 208 may be calculated using the following equation: $f_{BL}(x)=c_0+c_1x+c_2x^2+c_3x^3$. Ideally, the vehicle 204 remains on the virtual centerline 208, for a lane centering control objective. However, in practice, the vehicle 204 may remain on the virtual centerline 208 for other reasons, such as control error, localization error, or the like.

The right side constraints (e.g., the right lane marking of the current lane) may be calculated using the following equation: $f_R(x)=c_{0R}+c_1x+c_2x^2+c_3x^3$. The left side constraints (e.g., the left lane marking of the current lane) may be calculated using the following equation: $f_L(x)=c_{0L}+c_1x+c_2x^2+c_3x^3$. The desired path for the autonomous vehicle (i.e., the optimized autonomous vehicle trajectory 210) may be calculated using the following equation: $f_D(x)=a_0+a_1x+a_2x^2+a_3x^3+a_4x^4+a_5x^5$. The desired path coefficients are obtained using an initial condition and a final condition for the autonomous vehicle.

As an example, the following initial conditions may be used: $f_D(0)=0$, which indicates that the desired trajectory begins from the current position of the vehicle, as it makes sense to do so; $f'_D(0)=0$, which indicates that the first derivative of the desired trajectory is zero, at the current vehicle location; and $f''_D(0)=f''_{BL}(0)$, which indicates that the second derivative of the desired trajectory is same as the second derivative of the virtual center line of the lane. As part of the same example, the following final conditions may be used: $f_D(1)=f_{BL}(1)$ where '1' indicates 'normalized' look ahead distance, which indicates that the desired trajectory should be on the lane virtual centerline, at the final point; $f'_D(1)=f'_{BL}(1)$, which indicates that the desired trajectory should have the same first order derivative as the virtual lane centerline; and $f''_D(1)=f''_{BL}(1)$, which indicates that the desired trajectory should have the same second order derivative as the virtual lane centerline. The combination of these three described conditions (e.g., $f_D(1)=f_{BL}(1)$; $f'_{BL}(1)=f'_{BL}(1)$; $f''_D(1)=f''_{BL}(1)$) indicate that the desired trajectory should smoothly blend with the virtual centerline at the final point. For this particular example, it is important to note that a normalized convention is used. The number one (1), as used here, signifies the final point. The final point distance is a calibrated value, which can be constant or a function of the vehicle speed.

When the desired path extends outside of one or more of the constraints, iterative optimization may be used to bring the desired path closer to a location within the constraints. Iterative optimization may be accomplished by shaping the trajectory within the constraints. In the current literature the trajectory shaping is achieved by changing the initial condition and the final condition.

Using offset functions and an efficient numerical algorithm, it can be determined when the constraints are crossed. Offset functions g(x) of the desired path may be constructed using the constraints: $g_L(x)=f_L(x)-f_D(x)$, which signifies the offset of the desired trajectory from the left lane boundary; and $g_R(x)=f_R(x)-f_D(x)$, which signifies the offset of the desired trajectory from the right lane boundary. When the desired path is determined to exist at a location within the constraints, then the incremental optimization ends.

Figure 3:
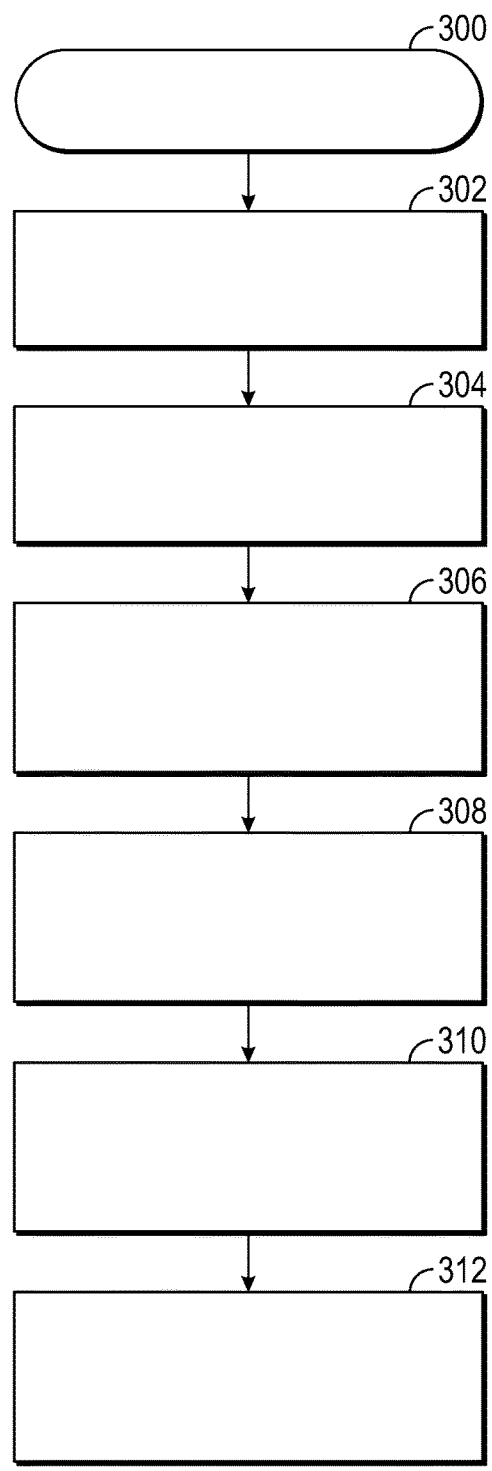
FIG. 3 is a flow chart that illustrates an embodiment of a process for performing autonomous operation of a vehicle.

FIG. 3 is a flow chart that illustrates an embodiment of a process 300 for performing autonomous operation of a vehicle. The various tasks performed in connection with process 300 may be performed by software, hardware, firmware, or any combination thereof. For illustrative purposes, the following description of process 300 may refer to elements mentioned above in connection with FIGS. 1-2. In practice, portions of process 300 may be performed by different elements of the described system. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

For ease of description and clarity, it is assumed the process 300 begins by obtaining object data, by a plurality of vehicle onboard sensors (step 302). Object data includes a location of, and other details associated with, an object within a vicinity of the vehicle, and which may hinder the vehicle traveling a route. An object may be other vehicles, road barriers, road cones, or any other physical driving obstacle which is located outside the vehicle. Objects are physical obstacles that obstruct the traveling route for the vehicle, and object data may also be referred to as "hard constraints" to an autonomous vehicle trajectory. Road boundaries are also considered hard constraints, as it is assumed that there is a curb or guard rail at the end of the road, which is also a physical obstacle. Objects and object data may be detected by one or more cameras, radar sensors, and any other sensor onboard the vehicle 100 which may be used to provide data associated with autonomous control of the vehicle 100. In some embodiments, Long Range Radar sensors (LRRs) and Short Range Radar sensors (SRRs) are used to detect objects within sensor detection proximity to the autonomous vehicle.

Next, the process 300 obtains road data, by one or more cameras onboard the vehicle (step 304). Road data may include a road curvature and a road heading, obtained by the vehicle onboard cameras. The camera will give all the 4 lane coefficient for the Right and left lane markings, per the following equations: $f_R(x)=c_{0R}+c_1x+c_2x^2+c_3x^3$, for the right lane marking, and $f_L(x)=c_{0L}+c_1x+c_2x^2+c_3x^3$, for the left lane marking, wherein $C_O$ is the offset of lane marking from the vehicle, $C_1$ is the heading of the lane marking, $C_2$ is the curvature of the lane marking, and $C_3$ is the rate of curvature of the lane marking. Here, the $C_1$, $C_2$, and $C_3$ coefficients are assumed to be parallel, or close to parallel, for the right and left markings, and are thus the same. This approximation serves to simplify the trajectory optimization calculations. However, the $C_0$ coefficients are different for the right marking and the left marking, and if the vehicle is positioned at the center of the lane, the $C_0$ coefficients are of different signs.

In certain embodiments, road data may also include GPS and map data associated with a current location of the vehicle, or the like. In some embodiments, road data may also include additional attributes of the road, such as a number of lanes, speed limits, lane marking types, road bank and slope angles, or the like.

The process 300 then determines, by at least one processor, an initial vehicle trajectory, based on the object data and the road data (step 306). The initial vehicle trajectory is a calculated vehicle trajectory for the autonomous vehicle, as described previously with regard to FIG. 2.

Figure 4:
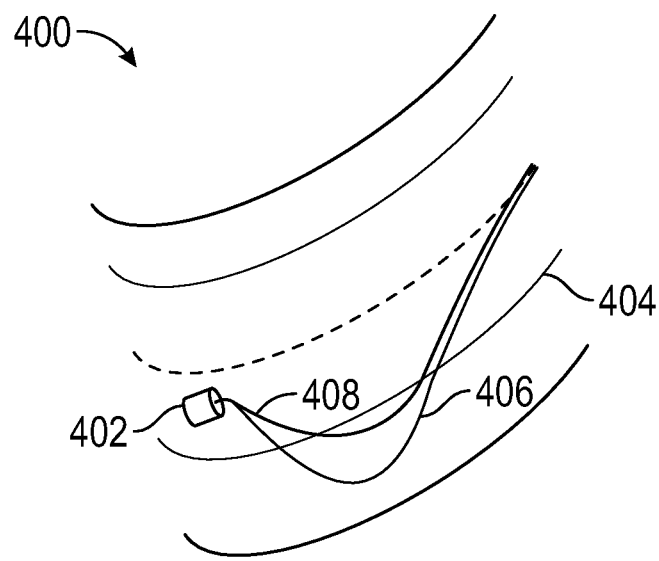
FIG. 4 is a diagram of autonomous vehicle trajectory optimization using soft constraints, in accordance with the disclosed embodiments.
Figure 5:
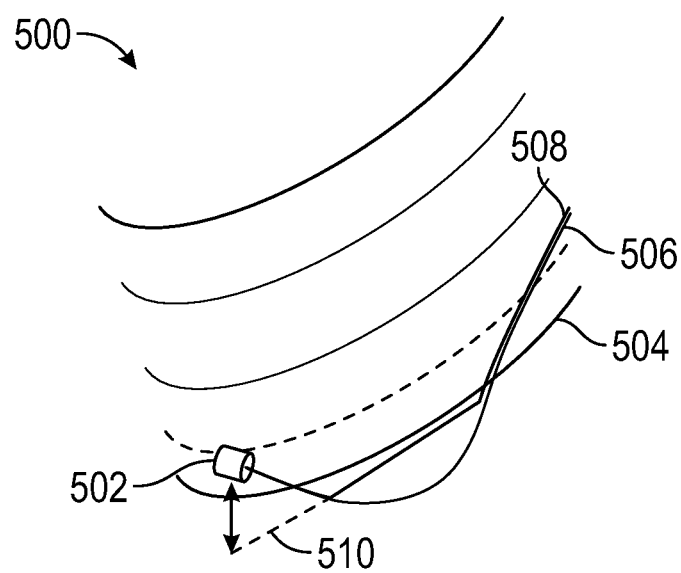
FIG. 5 is a diagram of autonomous vehicle trajectory optimization using hard constraints, in accordance with the disclosed embodiments.

Next, the process 300 identifies, by the at least one processor, a set of constraints associated with the initial vehicle trajectory (step 308). The set of constraints is any physical condition associated with the vehicle trajectory that limits possible options for vehicle positioning and traveling, and may include soft constraints and/or hard constraints. One particular example of soft constraints associated with an initial vehicle trajectory is shown in FIG. 4, and an example of hard constraints associated with an initial vehicle trajectory is shown in FIG. 5. A "soft constraint" is a non-detrimental restriction on the calculated driving route for the autonomous vehicle. Ideally, a soft constraint should not be breached by the autonomous vehicle during travel, but violating a soft constraint generally does not inflict immediate damage to, or destruction of, the vehicle. A "hard constraint" or detrimental restriction on the calculated driving route for the autonomous vehicle. A hard constraint cannot be breached by the autonomous vehicle during travel without inflicting damage to the autonomous vehicle, including possible destruction of the autonomous vehicle.

Next, the process 300 determines a final vehicle trajectory, based on the initial vehicle trajectory and the set of constraints (step 310). One particular embodiment for determining a final vehicle trajectory is described with regard to FIG. 6. Here, the process 300 iteratively optimizes the pre-calculated initial vehicle trajectory by adjusting the positions of the initial vehicle trajectory to consider the soft constraints and the hard constraints.

The process 300 then transmits the final vehicle trajectory to a steering mechanism onboard the vehicle (step 312). Once transmitted, the final vehicle trajectory is used to steer the vehicle autonomously.

FIG. 4 is a diagram of autonomous vehicle trajectory optimization using soft constraints, in accordance with the disclosed embodiments. A vehicle trajectory optimization system (see FIG. 1, reference 102) receives an initial vehicle trajectory 406, which is then analyzed against a set of constraints. The system determines whether predicted vehicle positions included in the trajectory satisfy the set of constraints and, when the set of constraints are not satisfied, the system "optimizes" to meet the constraints. The set of adjusted (i.e., optimized) vehicle positions for a route may be referred to as an optimized vehicle trajectory 408. An optimized vehicle trajectory 408 is generally calculated for a time-based or a distance-based segment of a defined route. The system determines a predicted vehicle position at time-based or distance-based intervals or, in other words, the predicted vehicle position is determined after a particular period of time has passed or after a particular distance has been traveled.

For example, as shown in FIG. 4, a vehicle 402 is shown traveling a segment 400 of a route. Here, the vehicle 402 is traveling an initial trajectory 406, which extends outside of lane boundary 404. The lane boundary 404 is a limitation on the drivable width of the road, and may also be referred to as a "soft constraint" or non-detrimental restriction on the calculated driving route for the autonomous vehicle 402. Ideally, a soft constraint should not be breached by the autonomous vehicle 402 during travel, but violating a soft constraint generally does not inflict immediate damage to, or destruction of, the vehicle. To clarify, if there exists another vehicle in the side lane, that will impose a hard constraint on the trajectory. In that situation the vehicle 402 will not be allowed to move to the adjacent lane.

As shown, the autonomous vehicle 402 is traveling along a pre-calculated, initial vehicle trajectory 406 that extends beyond the lane boundary 404. Here, the lane boundary 404 is a soft constraint. A vehicle trajectory optimization system of the autonomous vehicle 402 analyzes and optimizes the initial vehicle trajectory 406 to generate the optimized vehicle trajectory 408, which considers a set of soft constraints (e.g., the lane boundary 404).

FIG. 5 is a diagram of autonomous vehicle trajectory optimization using hard constraints, in accordance with the disclosed embodiments. As shown, the vehicle trajectory optimization system (see FIG. 1, reference 102) receives an initial vehicle trajectory 506, which is then analyzed using a set of constraints. The system determines whether predicted vehicle positions included in the trajectory 506 satisfy the set of constraints and, when the set of constraints are not satisfied, the system "optimizes" the applicable vehicle position by adjusting the vehicle predicted positions to meet the constraints. The adjustment of the vehicle trajectory is obtained by changing the initial and final condition constraints. The set of adjusted (i.e., optimized) vehicle positions for a route may be referred to as the optimized vehicle trajectory 508. Similar to the embodiment illustrated in FIG. 4, the optimized vehicle trajectory 508 is generally calculated for a time-based or a distance-based segment of a defined route.

As shown in FIG. 5, a vehicle 502 is shown traveling a segment 500 of a route. Here an initial trajectory 506 is calculated for the vehicle 502, which extends outside of road boundary 504. In other words, the initial trajectory 506 extends off of the road, thereby automatically guiding the driving mechanism of the autonomous vehicle 502 to drive the autonomous vehicle 502 off of the road. The road boundary 504 is a non-negotiable boundary, and may be referred to as a "hard constraint" or detrimental restriction on the calculated driving route for the autonomous vehicle 502. A hard constraint cannot be breached by the autonomous vehicle 502 during travel without inflicting damage to the autonomous vehicle 502, including possible destruction of the autonomous vehicle 502.

As shown, the autonomous vehicle 502 is traveling along the pre-calculated, initial vehicle trajectory 506 that extends beyond the road boundary 504. Here, the road boundary 504 is a hard constraint. A vehicle trajectory optimization system of the autonomous vehicle 502 analyzes and optimizes the pre-calculated, initial vehicle trajectory 506 to generate an optimized vehicle trajectory 508, which considers the set of hard constraints (e.g., the road boundary 504) and provides a trajectory that brings the autonomous vehicle 502 back to the road between the road boundaries 504.

Figure 6:
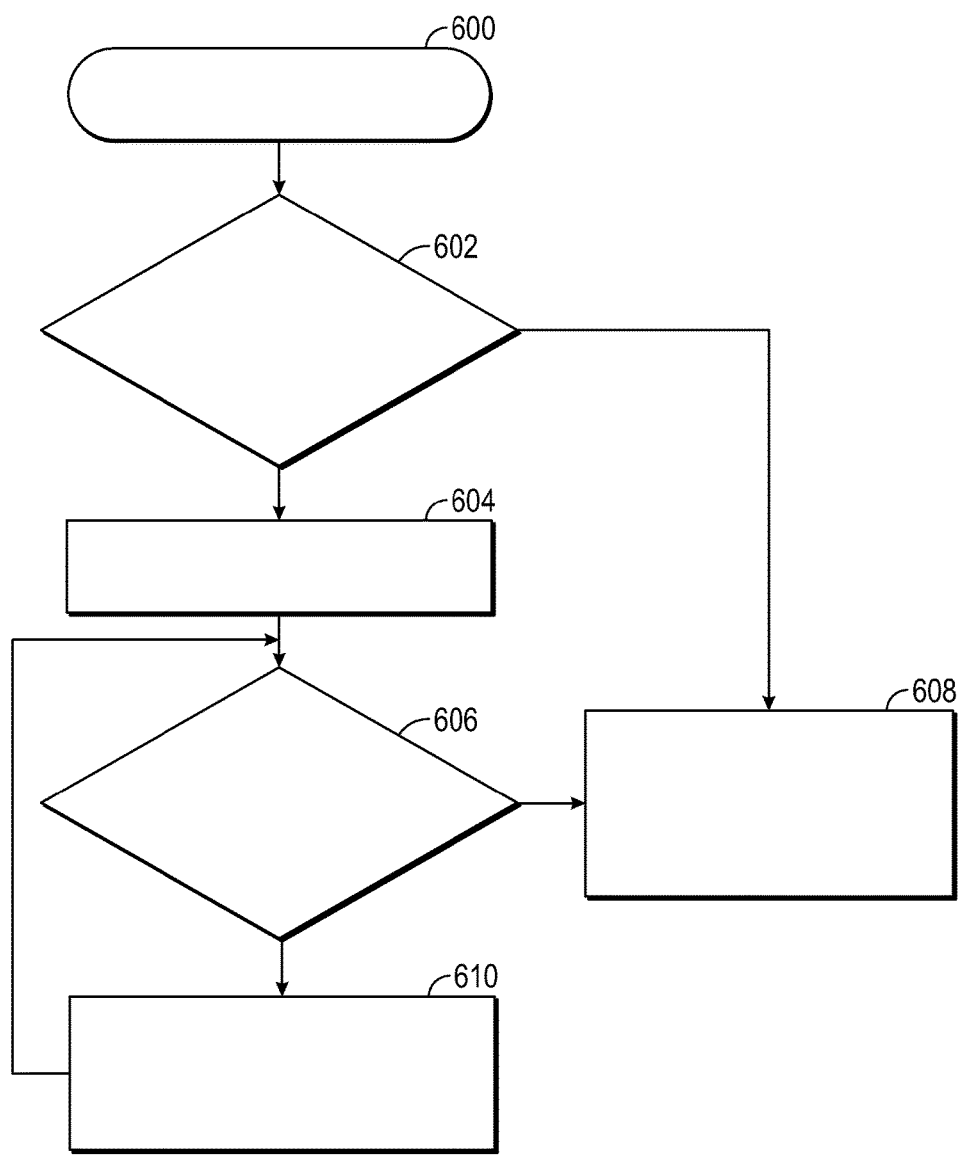
FIG. 6 is a flow chart that illustrates an embodiment of a process for determining a final vehicle trajectory.

FIG. 6 is a flow chart that illustrates an embodiment of a process 600 for determining a final vehicle trajectory. It should be appreciated that process 600 is an exemplary embodiment for performing step 310 of FIG. 3 (described previously), including additional detail. First, the process 600 determines whether an initial vehicle trajectory satisfies a set of soft constraints (decision 602). As described previously with regard to FIG. 3, a "soft constraint" is a non-detrimental restriction on the calculated driving route for the autonomous vehicle. Ideally, a soft constraint should not be breached by the autonomous vehicle during travel, but violating a soft constraint generally does not inflict immediate damage to, or destruction of, the vehicle. As soft constraint usually pertains to the "rules of the road". A "hard constraint" or detrimental restriction on the calculated driving route for the autonomous vehicle. A hard constraint cannot be breached by the autonomous vehicle during travel without inflicting damage to the autonomous vehicle, including possible destruction of the autonomous vehicle. It is important to note a trajectory which satisfies the set of soft constraints automatically satisfies the set of hard constraints. In other words, the set of hard constraints is either a subset of soft constraints or is more relaxed than a member of the soft constraint set. For example, if the vehicle is in the left-most lane of a three-lane road segment, then the left lane boundary (e.g., soft constraint) and the left road boundary (e.g., hard constraint) are the same. In this situation, the right lane boundary (e.g., soft constraint) and the right road boundary (e.g., hard constraint) are not same, but the soft constraint is more prohibitive than the hard constraints. Although this is an example, it should be appreciated that this rule can be generalized.

When the initial vehicle trajectory does satisfy the set of soft constraints (the "Yes" branch of 604), the process 600 performs a tactical imposition of hard constraints on the initial vehicle trajectory, to calculate the final trajectory (step 608).

When the initial vehicle trajectory does not satisfy the set of soft constraints (the "No" branch of 604), the process 600 calculates a strategically optimized vehicle trajectory (step 604). The strategically optimized vehicle trajectory is calculated using an actual vehicle position and the initial vehicle trajectory. The actual vehicle position is the place at which the vehicle is currently, physically located. The initial vehicle trajectory is the pre-calculated, initial trajectory (see reference 406, FIG. 4; reference 506, FIG. 5). Here, the process 600 "knows" the actual vehicle position and the initial vehicle trajectory, and calculates an optimized trajectory for the vehicle that may or may not be the same as the initial vehicle trajectory.

After calculating the strategically optimized vehicle trajectory (step 604), the process 600 determines whether the strategically optimized vehicle trajectory satisfies the soft constraints or optimization limits have been reached (decision 606). As one example of the soft constraints being violated (i.e., not satisfying the soft constraints), if the lane offset polynomials $g_L(x)$ and $g_R(x)$ change sign in any of its predicted positions, the corresponding lane boundary constraint is predicted to be violated. In examples where the optimization iteration limits have been exceeded, iterations are terminated with no trajectory found satisfying all the constraints. When the strategically optimized trajectory satisfies the soft constraints, or the optimization limits have been reached (the "Yes" branch of 606), the process 600 performs a tactical imposition of hard constraints on the strategically optimized trajectory, to calculate the final trajectory (step 608).

When the strategically optimized trajectory does not satisfy the soft constraints (the "No" branch of 606), the process 600 calculates a new vehicle trajectory a new initial vehicle condition and a new final vehicle condition (step 610), and then returns to step 606 to determine whether the new vehicle trajectory satisfies the soft constraints. The new vehicle trajectory is calculated by changing the initial second order derivative and final position to influence the trajectory. By changing the conditions using 'k' iterative steps, where 'k' is the optimization iteration limit, the following set of initial and final conditions will result in a more aggressive desired trajectory. Here, $f''_D(0) = -\text{sign}(f''_{BL}(0))*a_{MAX}/V_x^2$, where $a_{MAX}$ is the maximum lateral acceleration allowed at the initial condition, in the time domain, and used as a calibration parameter. Further, $f_D(1) = f_{BL}(1) +$ offset, away from the constraint violation, which is, again, another calibration handle.

In other embodiments, however, any other optimization techniques to influence the desired trajectory could also be used. For example, a Bezier curve may be used instead of, or in combination with, polynomial calculations. In this case, the Bezier curve uses a virtual control point to influence the trajectory instead of initial and final points of the trajectory.

Figure 7:
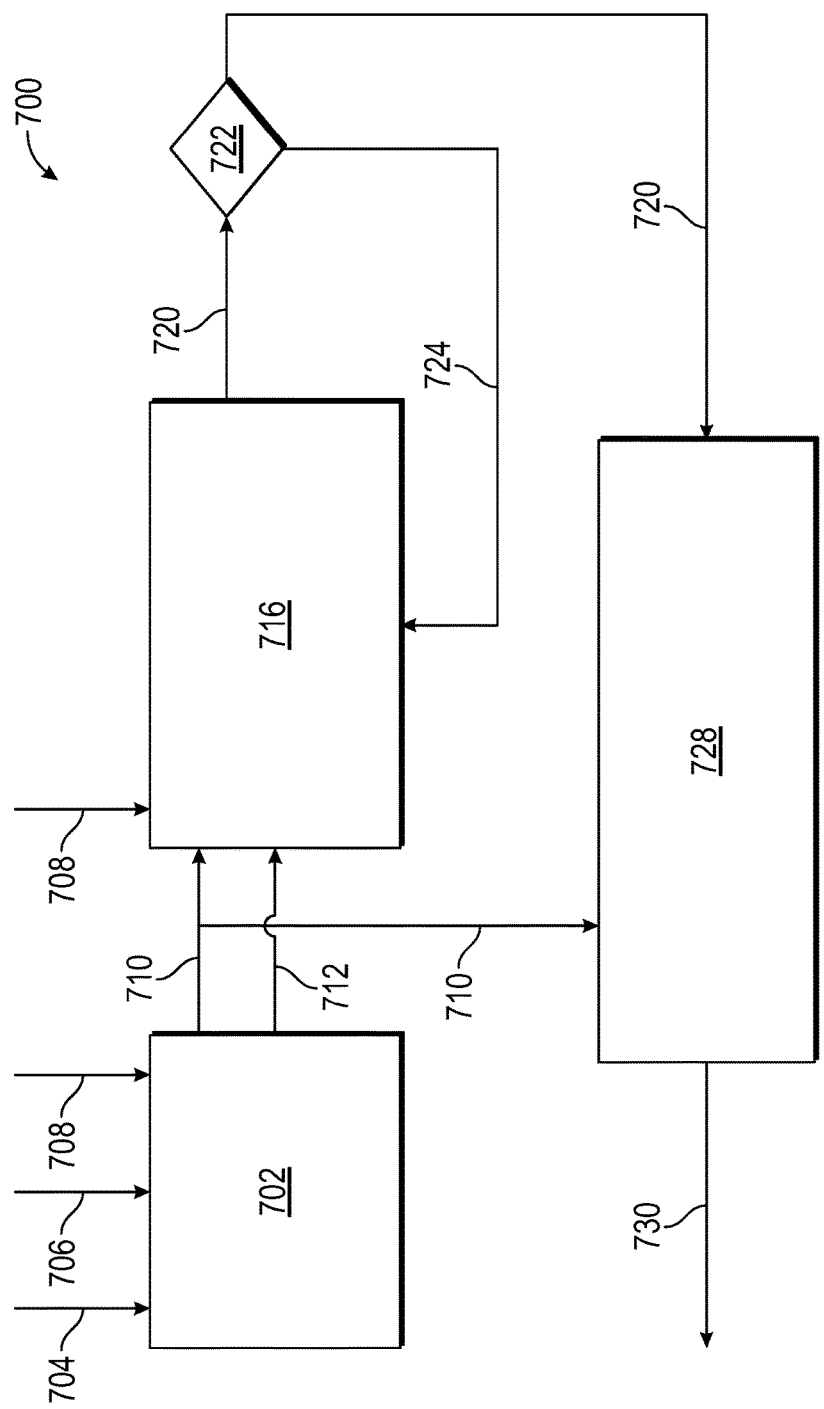
FIG. 7 is a flow diagram of an exemplary embodiment of a conceptual framework for determining a final vehicle trajectory.

FIG. 7 is a flow diagram of an exemplary embodiment of a conceptual framework for the process of FIG. 3. It should be appreciated that FIG. 7 depicts a simplified embodiment of the process 300 of FIG. 3, and that some implementations of the flow diagram 700 may include additional elements or components. The first sub-process 702 of the flow diagram 700 obtains input object data 704, road data 706, and a pre-calculated, initial vehicle trajectory 708. As described previously, object data may include other vehicles, road barriers, trees, or any other physical object that obstructs the autonomous vehicle from driving in a particular direction or through a particular location. Road data may include navigation data, road curvature, traffic information, or the like. In certain embodiments, road data may also include GPS and map data associated with a predicted location of the vehicle, or the like. In some embodiments, road data may also include additional attributes of the road, such as a number of lanes, speed limits, lane marking types, road bank and slope angles, or the like. The initial vehicle trajectory 708 is calculated prior to the optimization performed using the flow diagram 700, and the optimization results in a final desired path 730 for the autonomous vehicle.

The first sub-process 702 evaluates soft constraints 712 and hard constraints 710, and classifies road features and objects as a soft constraint 712 or a hard constraint 710. The soft constraints 712 and hard constraints 710 associated with the initial vehicle trajectory 708 are then used as inputs to the second sub-process 716 of the flow diagram 700. In certain embodiments, the set of hard constraints 710 is a subset of the set of soft constraints 712. As one example, road boundaries are a subset of lane boundaries, because left road boundary is the left lane boundary of the left-most lane, and the right road boundary is the right lane boundary of the right-most lane. Here, the hard constraints (e.g, the left road boundary and the right road boundary) are contained within the set of soft constraints (e.g., the left lane boundary and the right lane boundary). As another example, a constraint imposed by an object is a hard constraint, but is also included in the soft constraint set.

The second sub-process 716 performs a strategic evaluation and calculation of a desired path. The second sub-process 716 calculates desired path polynomial parameters are calculated using an initial condition (i.e., a current vehicle condition) and a final condition (i.e., a initial vehicle trajectory 708 position). Additionally, the second sub-process 716 calculates a dynamic offset based on road curvature and other parameters.

The third sub-process 722 evaluates the strategically optimized desired path 720 calculated by the second sub-process 716 to determine whether the hard constraints 710 and the soft constraints 712 are met, and to determine whether optimization limits have been reached. When the hard constraints 710 and the soft constraints 712 are not met by the desired path calculated by the second sub-process 716, then the flow diagram 700 reverts back to the second sub-process 716, which performs an additional iteration of calculations for optimizing the trajectory. Here, the initial condition and the final condition are optimized to aim the desired trajectory within the constraints.

When the hard constraints 710 and the soft constraints 712 are met by the desired path calculated by the second sub-process 716, then the strategically optimized desired path 720 is provided as an input for the fourth sub-process 728, which performs a tactical evaluation and calculation of the desired path. The fourth sub-process 728 evaluates desired path polynomial parameters using an initial condition (i.e., a current vehicle condition) and a final condition (i.e., a predicted vehicle trajectory 708 position), to generate a final desired path 730. The final desired path 730 is an "optimized" version of the initial vehicle trajectory 708, which considers the hard constraints 710 and the soft constraints 712 to produce instructions for an autonomous vehicle that are more accurate in adhering to the road and avoiding obstacles during travel.

During performance of the tactical evaluation and calculation of the desired path, the fourth sub-process 728 imposes the hard constraints 710. The fourth sub-process 728 may blindly impose the hard constraints 710 in cases involving one or more objects or a guard-rail (if the location of the guard-rail is available from the map data). In this example, the desired trajectory (i.e., the final desired path 730) is located on the hard constraint 710 entirely or partly.

In cases where the hard constraint 710 is imposed by the road boundary, but there is space available and the vehicle trajectory and speed is such that the vehicle is already driving in a trajectory that is directed across the road boundary and off of the road, it is not practical to change a driving direction quickly. This situation is illustrated in FIG. 5. In this scenario, the fourth sub-process 728 modifies the hard constraint 710 road boundary, using a set of calibrations, into a shape similar to the modified right lane boundary 510 of FIG. 5, instead of the original road boundary 504. Using the modified right lane boundary 510, the final desired path is calculated to be the optimized vehicle trajectory 508. Returning to FIG. 7, thus, the fourth sub-process 728 calculates the final desired trajectory 730 by imposing the hard constraint 710 and, potentially, manipulating the hard constraint 710 slightly, under certain conditions. Such manipulation is done only to manipulate specific hard constraints which pertain to rules of the road (e.g., a road boundary), but not to hard constraints which pertain to collision risk (e.g., a predicted trajectory of another vehicle in cross lane or parallel lane).

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element, node, and/or feature is directly or indirectly joined to (or directly or indirectly communicates with) another element, node, or feature, and not necessarily mechanically. Likewise, unless expressly stated otherwise, "connected" means that one element, node, or feature is directly joined to (or directly communicates with) another element, node, or feature, and not necessarily mechanically. Thus, although the schematic shown in FIG. 1 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for performing autonomous operation of a vehicle, by a vehicle onboard computer system comprising at least one processor and a system memory element, the method comprising:
   obtaining object data, by the at least one processor via a plurality of vehicle onboard sensors;
   obtaining road data, by the at least one processor via one or more cameras onboard the vehicle, wherein the road data comprises at least a left lane marking of a road lane of a road and a right lane marking of the road lane of the road, and wherein the vehicle is traveling on the road;
   calculating a virtual centerline of the road lane using a lane centering polynomial equation to perform lane centering control of the vehicle, based on the object data and the road data, by the at least one processor, wherein an initial vehicle trajectory comprises the virtual centerline;
   identifying a set of constraints associated with the initial vehicle trajectory, by the at least one processor, wherein the set of constraints comprises at least the left lane marking represented by a left constraint polynomial equation and the right lane marking represented by a right constraint polynomial equation determined by the one or more cameras;
   calculating an optimized vehicle trajectory, based on the initial vehicle trajectory, the set of constraints, an initial condition for the vehicle, and a final condition for the vehicle, wherein the initial condition comprises an actual current vehicle position of the initial vehicle trajectory, and wherein the final condition comprises a final position on the initial vehicle trajectory indicating that the optimized vehicle trajectory is on the virtual centerline at the final position;
   when the optimized vehicle trajectory crosses one of the set of constraints, performing an iterative optimization by:
      updating the initial condition for the vehicle and the final condition for the vehicle, to generate an updated initial condition and an updated final condition;
      calculating an updated optimized vehicle trajectory using the updated initial condition, the updated final condition, the lane centering polynomial equation, the left constraint polynomial equation, and the right constraint polynomial equation; and
      determining whether the updated optimized vehicle trajectory crosses the one of the set of constraints; and
      repeating the iterative optimization until the updated optimized vehicle trajectory satisfies the set of constraints by not crossing one of the set of constraints; and
   when the updated optimized trajectory does not cross the one of the set of constraints, transmitting a final vehicle trajectory to a steering mechanism onboard the vehicle, wherein the final vehicle trajectory comprises the updated optimized vehicle trajectory.

2. The method of claim 1, wherein identifying the set of constraints further comprises:

identifying a set of soft constraints associated with potential driving obstacles, wherein the set of soft constraints comprises non-detrimental restrictions on the initial vehicle trajectory, the optimized vehicle trajectory, and the updated optimized vehicle trajectory; and identifying a set of hard constraints associated with actual driving obstacles, wherein the set of hard constraints comprises physical obstacles that obstruct a traveling route for the vehicle on the road; and wherein the final vehicle trajectory is determined based on the set of soft constraints and the set of hard constraints.

3. The method of claim 2, wherein the set of hard constraints comprises at least one of a road boundary and a location of a road object; and wherein the final vehicle trajectory is determined based on the at least one of a road boundary and a location of a road object.

4. The method of claim 2, wherein determining the final vehicle trajectory further comprises:

determining whether the initial vehicle trajectory is within the set of soft constraints, wherein the set of soft constraints includes at least one of the left lane marking and the right lane marking; and when the initial vehicle trajectory is within the set of soft constraints, performing a tactical imposition of hard constraints on the initial vehicle trajectory, to calculate the final vehicle trajectory.

5. The method of claim 2, further comprising:

determining whether the optimized vehicle trajectory satisfies the set of soft constraints; and when the optimized vehicle trajectory does not satisfy the set of soft constraints, performing the iterative optimization comprising:

adjusting the initial vehicle condition and the final vehicle condition to create a new initial condition and a new final condition;

calculating a new vehicle trajectory to adjust the strategically optimized trajectory using the new initial condition and the new final condition; and calculating the final vehicle trajectory, based on the new vehicle trajectory.

6. The method of claim 5, further comprising:

repeating the iterative optimization until the new vehicle trajectory satisfies the set of soft constraints; and performing a tactical imposition of hard constraints on the new vehicle trajectory, to calculate the final vehicle trajectory.

7. A system for performing autonomous operation of a vehicle traveling on a road, the system comprising:

a system memory element;

a plurality of vehicle onboard sensors, configured to obtain object data associated with objects surrounding the vehicle;

one or more cameras, configured to:

obtain road data associated with a road the vehicle is traveling;

identify a left lane marking of a road lane on the road and a right lane marking of the road lane on the road; and determine a left constraint polynomial equation representing the left lane marking and a right constraint polynomial equation representing the right lane marking;

a steering mechanism for the vehicle, the steering mechanism configured to autonomously maneuver the vehicle according to a set of optimized vehicle trajectory data; and at least one processor communicatively coupled to the system memory element, the plurality of vehicle sensors, the one or more cameras, and the steering mechanism, the at least one processor configured to:

calculate a virtual centerline of the road lane using a lane centering polynomial equation to perform lane centering control of the vehicle, based on the object data and the road data, wherein an initial vehicle trajectory comprises the virtual centerline;

identify a set of constraints associated with the initial vehicle trajectory, wherein the set of constraints comprises at least the left lane marking represented by the left constraint polynomial equation and the right lane marking represented by the right constraint polynomial equation; and calculate an optimized vehicle trajectory, based on the initial vehicle trajectory, the set of constraints, an initial condition for the vehicle, and a final condition for the vehicle, wherein the initial condition comprises an actual current vehicle position of the initial vehicle trajectory, and wherein the final condition comprises a final position on the initial vehicle trajectory indicating that the optimized vehicle trajectory is on the virtual centerline at the final position;

when the optimized vehicle trajectory crosses one of the set of constraints, performing an iterative optimization by:

updating the initial condition for the vehicle and the final condition for the vehicle, to generate an updated initial condition and an updated final condition;

calculating an updated optimized vehicle trajectory using the updated initial condition, the updated final condition, the lane centering polynomial equation, the left constraint polynomial equation, and the right constraint polynomial equation; and determining whether the updated optimized vehicle trajectory crosses the one of the set of constraints; and repeating the iterative optimization until the updated optimized vehicle trajectory satisfies the set of constraints by not crossing one of the set of constraints; and when the updated optimized vehicle trajectory does not cross the one of the set of constraints, transmit a final vehicle trajectory to the steering mechanism, wherein the final vehicle trajectory comprises the updated optimized vehicle trajectory.

8. The system of claim 7, wherein the at least one processor is further configured to:

determine whether the initial vehicle trajectory is within a set of constraints, wherein the set of soft constraints includes at least one of the left lane marking and the right lane marking; and when the initial vehicle trajectory is within the set of constraints, perform a tactical imposition of hard constraints on the initial vehicle trajectory, to calculate the final vehicle trajectory.

9. The system of claim 7, wherein the at least one processor is further configured to:

determine whether the optimized vehicle trajectory satisfies the set of soft constraints; and when the optimized vehicle trajectory does not satisfy the set of soft constraints, perform the iterative optimization process comprising:

adjusting the initial vehicle condition and the final vehicle condition to create a new initial condition and a new final condition;

calculating a new vehicle trajectory to adjust the optimized vehicle trajectory using the new initial condition and the new final condition; and calculating the final vehicle trajectory, based on the new vehicle trajectory.

10. The system of claim 7, wherein the at least one processor is further configured to:

identify a curvature of the initial vehicle trajectory;

determine a dynamic offset for the initial vehicle trajectory, based on the curvature; and determine the final vehicle trajectory using the dynamic offset.

11. The system of claim 7, wherein the at least one processor is further configured to:

identify a set of soft constraints associated with potential driving obstacles, wherein the set of constraints comprises the set of soft constraints, and wherein the set of soft constraints comprises non-detrimental restrictions on the initial vehicle trajectory, the optimized vehicle trajectory, and the updated optimized vehicle trajectory;

identify a set of hard constraints associated with actual driving obstacles, wherein the set of constraints comprises the set of hard constraints, and wherein the set of hard constraints comprises physical obstacles that obstruct a traveling route for the vehicle on the road; and determine the final vehicle trajectory based on the set of soft constraints and the set of hard constraints.

12. A non-transitory, computer-readable medium containing instructions thereon, which, when executed by a processor, perform a method comprising: obtaining object data via a plurality of vehicle onboard sensors; obtaining road data via one or more cameras onboard an autonomous vehicle, wherein the road data comprises at least a left lane marking of a road lane of a road and a right lane marking of the road lane of the road, and wherein the autonomous vehicle is traveling on the road; calculating a virtual centerline of the road lane using a lane centering polynomial equation to perform lane centering control of the autonomous vehicle, based on the object data and the road data, wherein an initial vehicle trajectory comprises the virtual centerline; identifying a set of constraints associated with the initial vehicle trajectory, wherein the set of constraints comprises at least the left lane marking represented by a left constraint polynomial equation and the right lane marking represented by a right constraint polynomial equation determined by the one or more cameras; calculating an optimized vehicle trajectory for the autonomous vehicle based on an initial vehicle trajectory, the set of constraints surrounding the autonomous vehicle, an initial condition for the autonomous vehicle, and a final condition for the autonomous vehicle, wherein the initial condition comprises an actual current vehicle position of the initial vehicle trajectory, and wherein the final condition comprises a final position on the initial vehicle trajectory indicating that the optimized vehicle trajectory is on the virtual centerline at the final position;

when the optimized vehicle trajectory crosses a constraint of the set of constraints, performing an iterative optimization by:

updating the initial condition for the vehicle and the final condition for the autonomous vehicle, to generate an updated initial condition and an updated final condition;

calculating an updated optimized vehicle trajectory using the updated initial condition, the updated final condition, the lane centering polynomial equation, the left constraint polynomial equation, and the right constraint polynomial equation; and determining whether the updated optimized vehicle trajectory crosses the constraint of the set; and repeating the iterative optimization until the updated optimized vehicle trajectory satisfies the set of constraints by not crossing any constraint of the set of constraints; and when the updated optimized vehicle trajectory does not cross any constraint of the set of constraints, transmitting the optimized vehicle trajectory to a steering mechanism onboard the autonomous vehicle.

13. The non-transitory, computer-readable medium of claim 12, wherein the method further comprises:

determining the set of constraints associated with a potential vehicle trajectory, by:

identifying a set of soft constraints associated with potential driving obstacles, wherein the set of soft constraints comprises non-detrimental restrictions on the initial vehicle trajectory, the optimized vehicle trajectory, and the updated optimized vehicle trajectory; and identifying a set of hard constraints associated with actual driving obstacles, wherein the set of hard constraints comprises physical obstacles that obstruct a traveling route for the vehicle on the road;

wherein the vehicle trajectory is determined based on the set of soft constraints and the set of hard constraints.

14. The non-transitory, computer-readable medium of claim 12, wherein the method further comprises:

determining whether the optimized vehicle trajectory satisfies the set of constraints; and when the optimized vehicle trajectory does not satisfy the set of constraints, performing the iterative optimization comprising:

adjusting the initial vehicle condition and the final vehicle condition to create a new initial condition and a new final condition;

calculating a new vehicle trajectory to adjust the optimized vehicle trajectory using the new initial condition and the new final condition; and calculating the optimized vehicle trajectory, based on the new vehicle trajectory.

15. The non-transitory, computer-readable medium of claim 14, wherein the method further comprises:

repeating the iterative optimization until the new vehicle trajectory satisfies the set of constraints; and performing a tactical imposition of hard constraints on the new vehicle trajectory, to calculate the optimized vehicle trajectory.

* * * * *